United States Patent
Malloy Desormeaux et al.

(10) Patent No.: US 6,385,404 B1
(45) Date of Patent: May 7, 2002

(54) DUAL FILM IMAGE AND ELECTRONIC IMAGE CAPTURE CAMERA CAPABLE OF COMBINING CAPTURED ELECTRONIC IMAGES IN A SINGLE MULTI-(INDEX-) IMAGE

(75) Inventors: Stephen G. Malloy Desormeaux, Rochester; Roger A. Fields, Pittsford, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/643,783

(22) Filed: Aug. 22, 2000

(51) Int. Cl.⁷ .......................... G03B 1/00; G03B 17/24; H04N 9/47; H04N 5/76
(52) U.S. Cl. ...................... 396/311; 396/410; 396/429; 348/64; 348/232
(58) Field of Search ................................. 396/429, 410, 396/413, 387, 311; 348/64, 231, 232, 233

(56) References Cited

U.S. PATENT DOCUMENTS

| | | | |
|---|---|---|---|
| 4,456,931 A | * 6/1984 | Toyoda et al. | 348/233 X |
| 4,827,347 A | 5/1989 | Bell | 348/333.05 |
| 5,534,956 A | * 7/1996 | Iwashita et al. | 396/311 |
| 5,535,011 A | 7/1996 | Yamagami et al. | 386/117 |
| 5,633,733 A | 5/1997 | Miyazawa | 358/527 |
| 5,635,984 A | 6/1997 | Lee | 348/333.05 |
| 5,903,309 A | 5/1999 | Anderson | 348/333.02 |
| 5,940,121 A | 8/1999 | McIntyre et al. | 348/64 |
| 5,943,050 A | 8/1999 | Bullock et al. | 348/333.01 |
| 5,978,016 A | 11/1999 | Lourette et al. | 348/64 |
| 6,055,381 A | 4/2000 | Maruyama | 396/429 X |
| 6,212,337 B1 | * 4/2001 | Petruchik et al. | 396/311 |

\* cited by examiner

*Primary Examiner*—W. B. Perkey
(74) *Attorney, Agent, or Firm*—Roger A. Fields (57) ABSTRACT

A dual image capture camera captures successive film images on a filmstrip and captures successive electronic images that correspond to the respective film images. The camera has a memory that individually stores captured electronic images, a film drive motor that is actuated to rewind an exposed film length with the respective film images into a film cartridge, and a print quantity selector that is capable of being manually operated to provide various print quantity designations of how many prints are to be made for the respective film images. The print quantity selector can designate that no print is to be made for a particular film image. The memory is connected to the print quantity selector to store designations of numbers of prints in association with the respective electronic images individually stored in the memory and is connected to the film drive motor to store captured electronic images as a single multi-image which combines only those electronic images for which the designated number of prints is at least "1" when the exposed film length with the respective film images is rewound into the film cartridge.

12 Claims, 5 Drawing Sheets

FIG. 5

DUAL FILM IMAGE AND ELECTRONIC IMAGE CAPTURE CAMERA CAPABLE OF COMBINING CAPTURED ELECTRONIC IMAGES IN A SINGLE MULTI-(INDEX-) IMAGE

CROSS-REFERENCE TO RELATED APPLICATIONS

Reference is made to commonly assigned copending applications Ser. No. 09/499,812, entitled CAMERA THAT RECORDS PRINT QUANTITY DESIGNATION ON FILM FOR EACH EXPOSURE, AND HAS PRINT QUANTITY TOTALING and filed Feb. 8, 2000 in the name of Stephen G. Malloy Desormeaux, James W. Fulmer and Robert Hills and to Ser. No. 09/494,012, entitled DUAL FILM EXPOSURE, ELECTRONIC EXPOSURE CAMERA WITH ELECTRONIC INFORMATION EDITING AFTER EACH EXPOSURE AND INFORMATION RECORDING ON FILM AFTER COMPLETED EXPOSURE and filed Jan. 28, 2000 in the name of Robert Hills and James W. Fulmer.

FIELD OF THE INVENTION

The invention relates generally to the field of cameras, and in particular a dual film image and electronic image capture camera capable of combining captured electronic images in a single multi- (index-) image.

BACKGROUND OF THE INVENTION

Recently, a dual image capture (or hybrid) camera has been proposed for substantially simultaneously capturing a film image of a subject being photographed and an electronic image of the subject. The camera includes a film image capture or taking lens, an electronic image capture lens, and an image display that shows a captured electronic image of a subject which corresponds to a captured film image of the subject. The displayed electronic image permits one to verify they got the captured film image they Wanted. See prior art U.S. Pat. No. 6,055,381 issued Apr. 25, 2000, which is incorporated in this application.

The Cross-Referenced Applications

The cross-referenced application Ser. No. 09/499,812, entitled CAMERA THAT RECORDS PRINT QUANTITY DESIGNATION ON FILM FOR EACH EXPOSURE, AND HAS PRINT QUANTITY TOTALING discloses a dual image capture camera for capturing successive film images on a filmstrip and for capturing successive electronic images that correspond to the respective film images, in which a print quantity selector can be manually operated to provide various print quantity designations of the number of prints to be made for each one of the film images. A film drive motor for unwinding an unexposed film length from a film cartridge and rewinding the exposed film length with captured film images into the film cartridge is actuated to rewind the exposed film length into the film cartridge a first time, then to unwind the exposed film length from the film cartridge, and finally to rewind the exposed film length into the film cartridge a second time. The print quantity designations are magnetically recorded on the exposed film length as it is unwound from the film cartridge.

The cross-referenced application Ser. No. 09/494,012, entitled DUAL FILM EXPOSURE, ELECTRONIC EXPOSURE CAMERA WITH ELECTRONIC INFORMATION EDITING AFTER EACH EXPO AND INFORMATION RECORDING ON FILM AFTER COMPLETED EXPOSURE discloses a dual image capture camera for capturing successive film images on a filmstrip and for capturing successive electronic images that correspond to the respective film images, in which electronic information pertaining to the respective film images can be edited after each substantially simultaneous film and electronic image capture. The information is magnetically recorded on the exposed film length with captured film images when it is unwound from the film cartridge as in the cross-referenced application Ser. No. 09/499,812, entitled CAMERA THAT RECORDS PRINT QUANTITY DESIGNATION ON FILM FOR EACH EXPOSURE, AND HAS PRINT QUANTITY TOTALING.

SUMMARY OF THE INVENTION

According to one aspect of the invention, a dual image capture camera for capturing successive film images on a filmstrip and for capturing successive electronic images that correspond to the respective film images, including a memory that stores captured electronic images and a film drive motor that is actuated to rewind an exposed film length with the respective film images into a film cartridge, is characterized in that:

the memory is connected to the film drive motor to store captured electronic images as a single multi-image composed of the successive electronic images when the exposed film length with the respective film images is rewound into the film cartridge.

According to another aspect of the invention, a dual image capture camera for capturing successive film images on a filmstrip and for capturing successive electronic images that correspond to the respective film images, including a memory that stores captured electronic images, is characterized in that:

a print quantity selector is capable of being manually operated to provide various print quantity designations of how many prints are to be made for the respective film images, including the designation that no print is to be made for a particular film image; and the memory is connected to the print quantity selector to store captured electronic images as a single multi-image which combines only those electronic images for which the designated number of prints is at least "1".

DETAILED DESCRIPTION OF THE INVENTION

The invention is disclosed as being embodied preferably in a motorized film advance camera for substantially simultaneously capturing a film image of a subject being photographed and an electronic image of the subject. Because the features of a motorized film advance camera are generally known, the description which follows is directed in particular only to those elements forming part of or cooperating directly with the disclosed embodiment. It is to be understood, however, that other elements may take various forms known to a person of ordinary skill in the art.

Figure 1:
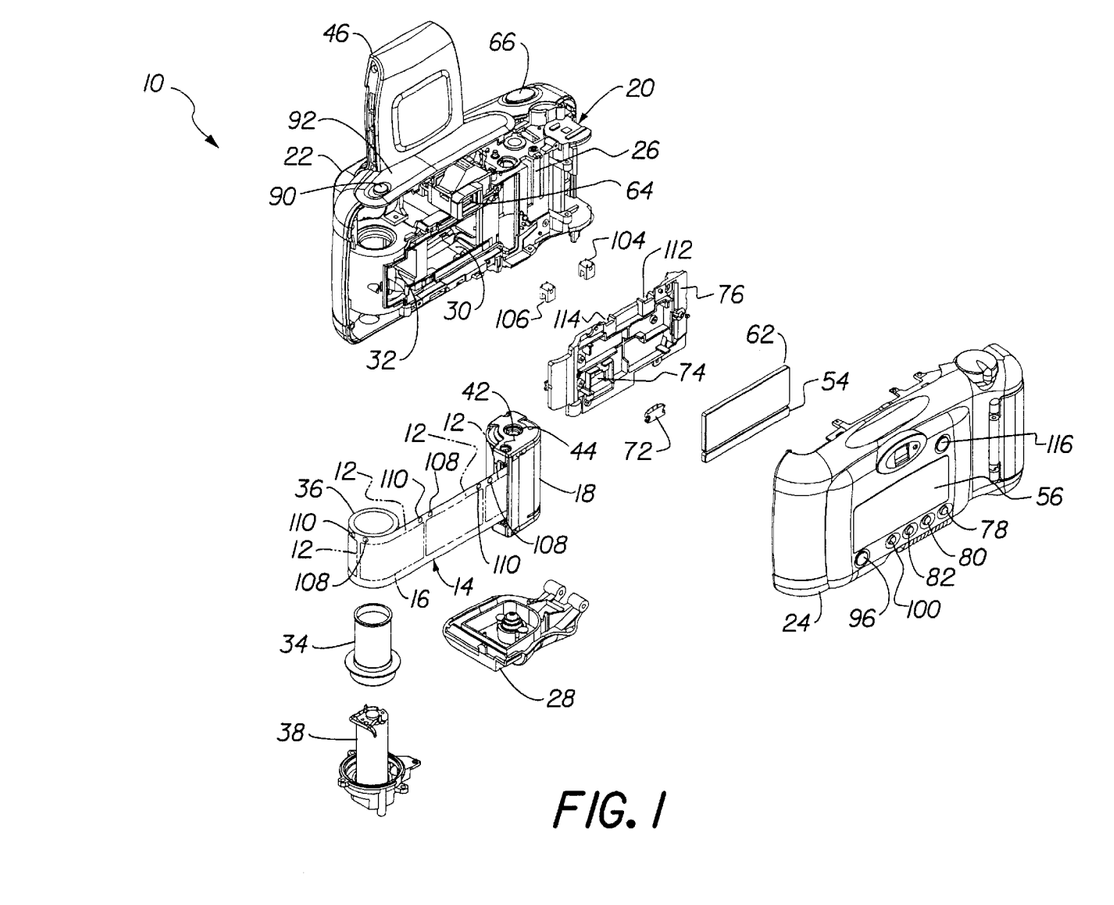
FIG. 1 is a rear exploded perspective view of a dual film image and electronic image Capture camera consistent with a preferred embodiment of the invention.
Figure 2:
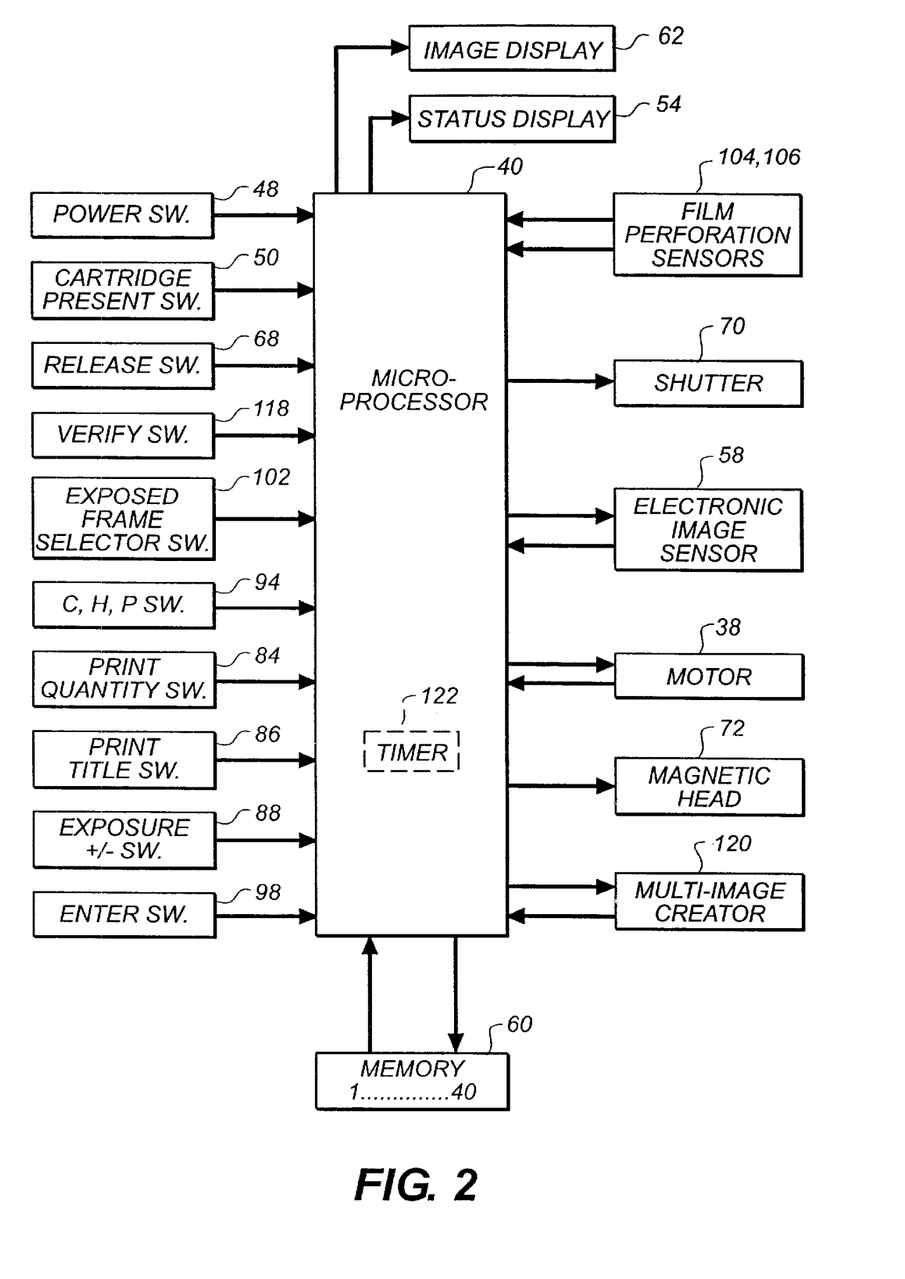
FIG. 2 is a block diagram of various components of the camera.

Referring now to the drawings, FIGS. 1 and 2 show a motorized film advance camera 10 for exposing latent images of a subject being photographed, i.e. capturing film images of the subject, on successive frames 12 of a known "Advanced Photo System" ("APS") filmstrip 14. The filmstrip 14 has a transparent magnetic overlay which gives it a magnetic recording capacity to store various user-selected information (subsequently described) along a magnetic information track 16 adjacent each exposed film frame 12, and it is normally housed in an opaque film cartridge 18. Typically, the "APS" filmstrip 14 is available in 15-exposure, 25-exposure, and 40-exposure lengths, and the user-selected information can differ from frame-to-frame.

The camera 10 has an opaque main body part 20 that is housed between a pair of connected opaque front and rear cover parts 22 and 24. See FIG. 1. The main body part 20 has a cartridge receiving chamber 26 for receiving the film cartridge 18 through a bottom opening (not shown) when a bottom door 28 is pivoted open, a rearwardly open back-frame opening 30 at which the respective frames 12 of the filmstrip 14 are temporarily positioned one at a time to be exposed, and an exposed film take-up chamber 32 that contains a film take-up spool 34. The film take-up spool 34 is incrementally rotated following each film exposure, i.e. each film image capture, to wind the most-recently exposed one of the film frames 12 onto an exposed film roll 36 on the spool and to position a fresh unexposed film frame at the backframe opening 30. When the film take-up spool 34 is incrementally rotated, the filmstrip 14 is advanced forward one frame increment (which is slightly greater than a frame width) from the film cartridge 18. A drive motor 38 resides inside the film take-up spool 34 for incrementally rotating the spool to advance the filmstrip 14 forward one frame increment, and its operation is controlled by a known microcomputer or control 40 having a built-in microprocessor. See FIG. 2. When substantially the entire length of the filmstrip 14 is exposed, i.e. the total number of available frames 12 are exposed, a spindle (not shown) which projects into a cavity 42 in a top end 44 of a film spool inside the film cartridge 18 is continuously rotated via the motor 38 and a suitable gear train (not shown) to rewind the exposed film length rearward into the film cartridge a first time.

To magnetically record the user-selected information along the magnetic information track 16 adjacent each exposed film frame 12, the motor 38 must be actuated (after the exposed film length is rewound rearward into the film cartridge 18 the first time) to continuously rotate the film take-up spool 34 in order to advance the exposed film length out of the film cartridge. The user-selected information is magnetically recorded along the magnetic track 16 as the exposed film length is unwound from the film cartridge 18. Then, when the information recording is completed, the motor 38 is actuated to continuously rotate the film spool inside the film cartridge 18 in order to rewind the film length rearward into the film cartridge a second time.

The bottom door 28 can thereafter be pivoted open to remove the film cartridge 18 from the cartridge receiving chamber 26.

A known electronic flash unit 46 for flash assisted exposures is flipped up from partially covering the front cover part 22 to uncover a known film image capture or taking lens (not shown), preparatory to using the camera 10. See FIG. 1. Flipping up the flash unit 46 closes a normally open power switch 48 connected to the microcomputer 40 to electrically power "on" the camera 10. See FIG. 2.

Figure 3:
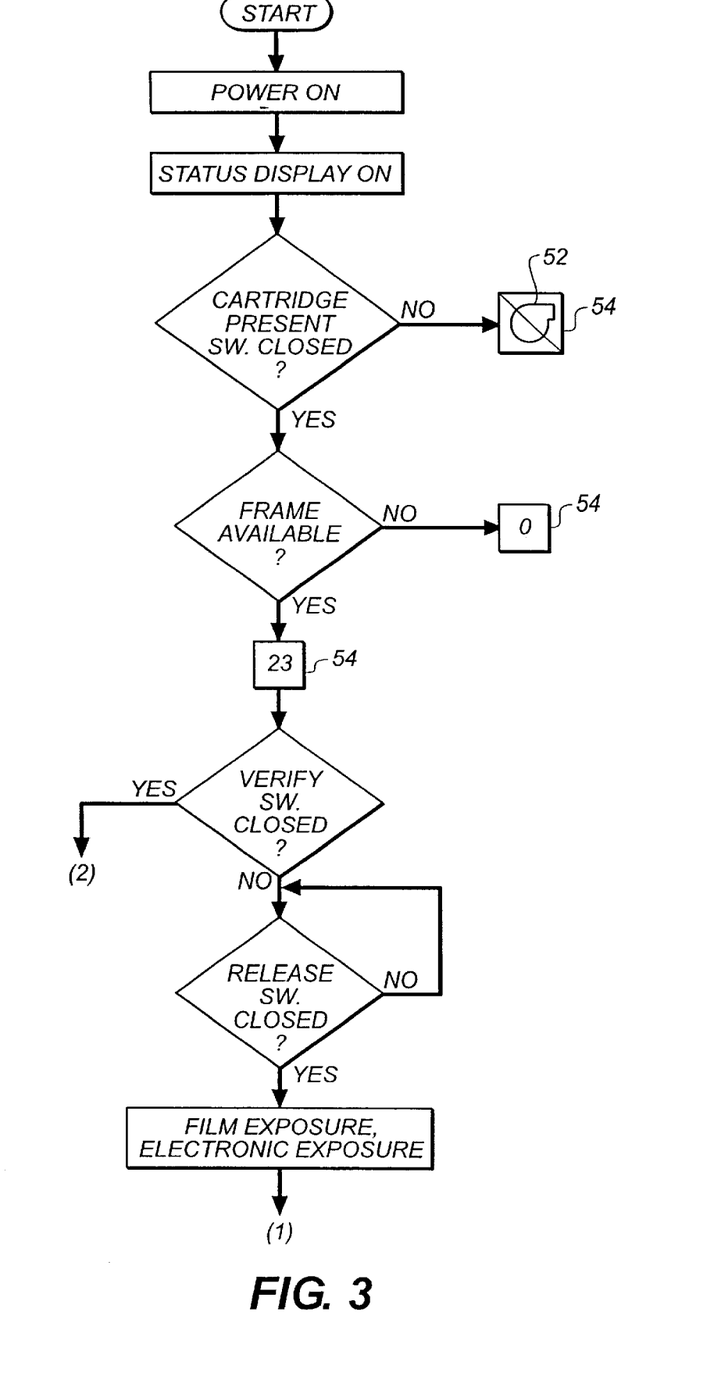
FIGS. 3, 4 and 5 are charts depicting operation of the camera.

A normally open cartridge present switch 50 in the cartridge receiving chamber 26 and connected to the microcomputer 40 is closed when the film cartridge 18 is present in the chamber and the door 28 is closed. See FIG. 2. If the camera 10 is powered "on" and the cartridge present switch 50 is open, a visible no-cartridge warning 52 shown in FIG. 3 is shown in a known status display 54 such as a black and white LCD connected to the microcomputer 40. The status display 54 is turned "on" when the power switch 48 is closed, and it is located behind a window 56 in the rear cover part 24. See FIG. 1. If the camera 10 is powered "on" and the cartridge present switch 50 is closed, a visible cartridge loaded indication (not shown) is shown in the status display 54.

A known electronic image sensor 58, for example a CCD sensor with integrated shuttering capability or a CMOS sensor with integrated shuttering capability, is fixed behind a known electronic image capture lens, lens (not shown). Flipping up the electronic flash unit 46 uncovers the electronic image capture lens. The electronic image sensor 58 is connected to the microcomputer 40 and forms a different electronic image of the subject, to provide electronic image capture of the subject, each time one of the unexposed film frames 12 is exposed. The respective electronic images correspond to the latent images on the exposed film frames 12, and they are converted via a known analog-to-digital converter (not shown) into digital image data to be individually stored in a memory 60 connected to the microcomputer 40 each time the filmstrip 14 is advanced forward one frame increment (following a film exposure) from the film cartridge 18. The memory 60 has a successive-image storage capacity for storing up to 40 captured electronic images at separate single-image addresses "1" . . . "40" in the memory (since the filmstrip 14 is available in 15-exposure, 25-exposure, and 40-exposure lengths). See FIGS. 1 and 2. The respective electronic images stored in the memory 60 at the single-image addresses "1" . . . can be shown in a known image display 62 such as a color LCD connected to the microcomputer. The image display 62 is located next to the status display 54, behind the window 56 in the rear cover part 24.

A known viewfinder 64 for viewing the subject (before it is photographed) is located on the main body part 20. See FIG. 1.

To take a picture of the subject, a shutter release button 66 on the front cover part 22 is manually depressed which in turn closes a normally open release switch 68 connected to the microcomputer 40. See FIGS. 1 and 2. The closed release switch 68 triggers momentary opening of a known normally closed shutter 70 to expose a latent image of the subject on the film frame 12 at the backframe opening 30, and to excite the electronic image sensor 58 to form an electronic image of the subject substantially simultaneously with exposure of the latent image.

A magnetic head 72 is mounted within an opening 74 in a film pressure platen 76 for magnetically recording the user-selected information along the magnetic information track 16 adjacent each one of the exposed film frames 12, when the exposed film length advanced out of the film cartridge. The film pressure platen 76 serves to support each film frame 12 flat for exposure at the backframe opening 30. See FIG. 1.

The user-selected information for each one of the exposed film frames 12 includes a print title (optional) in English or other language, a print exposure correction +/− (optional), any one of three known "APS" print formats "C" (classic), "H" (HDTV) and "T" (panoramic), and C−, H− and P− print quantity numbers preferably ranging from 0–9 prints (to indicate 1, 2, 3, 4, 5, 6, 7, 8, 9, or 0 prints). This allows "C" and/or "H" and/or "P" print formats (seven different possible choices) to be selected for any one of the exposed film frames 12, and it allows a corresponding C−, H− or P− print quantity number 0–9 to be selected for each one of the "C", "H" and "P" print formats that have been selected for the same exposed film frame. For example, for a particular one of the exposed film frames 12, the print quantity and print format selections can be two "C" format prints, one "H" format print, and no (zero) "P" format prints.

A print having a "C" format is typically 4 (height)×6 (width) inches. A print having a "H" format is typically 4 (height)×7 (width) inches. A print having a "P" format is typically 4 (height)×10 (width) inches or 4 (height)×11.59 (width) inches. No matter which one(s) of the print formats is (are) selected, "C", and/or "H" and/or "P", the exposed frames 12 on the filmstrip 14 are always in the "H" format. As is known, this allows re-prints to be made in any of the three formats rather than just in the selected format.

The selected print title, print exposure correction, "C" and/or "H" and/or "P" print format(s), and C− and/or H− and/or P− print quantity number(s) for every one of the exposed film frames 12 are stored as corresponding designations or assignments in the memory 60 for the respective film frames, in association with the captured electronic images stored in the memory. In practice, a selected print title, print exposure correction, "C" and/or "H" and/or "P" print format(s), and C− and/or H− and/or P− print quantity number(s) for the most-recently exposed one of the film frames 12 is stored in the memory 60 (along with the corresponding electronic image) each time the filmstrip 14 is advanced forward one frame increment (following a film exposure) from the film cartridge 18. See FIG. 4.

Individual visible indications of the selected print title, print exposure correction, and C− and/or H− and/or P− print quantity number(s) for any one of the exposed film frames 12 can be seen in the status display 54. Also, a visible indication of the selected "C" and/or "H" and/or "P" print format(s) for any one of the exposed film frames 12 can be seen in the image display 62 (preferably with the selected "C" and/or "H" and/or "P" print format(s) superimposed on the captured electronic image shown in the image display).

When more than one of the "C", "H" and "P" print formats have been selected for any one of the exposed film frames 12, the visible indications of the selected print formats can be seen together, or alternatively they can be seen one at a time, in the image display 62.

Respective print quantity, title and exposure correction input buttons 78, 80 and 82 are provided on the rear cover part 24, and when individually manually depressed one or more times close normally open print quantity, title and exposure correction switches 84, 86 and 88 the same number of times. See FIGS. 1 and 2. The print quantity, title and exposure correction switches 84, 86 and 88 are connected to the microcomputer 40 to permit the selected C− and/or H− and/or P− print quantity number(s), title and exposure correction to be stored as designations or assignments to the memory 60 for a most-recently exposed one of the film frames 12 each time the filmstrip 14 is advanced forward one frame increment (following a film exposure) from the film cartridge 18, and to change the C− and/or H− and/or P− print quantity number(s), title and exposure correction stored in the memory 60 for any one of the exposed film frames 12 (including the most-recently exposed film frame) any time. A three-position print format selection/input button 90 is supported on a top plate 92 for manual movement into any one of three C−, H− and P− print format selection positions, and when manually depressed once in any one of the three positions closes a corresponding one of three normally open C, H and P switches 94, 95 and 96 once. The C, H and P switches 94, 95 and 96 are individually connected to the microcomputer 40 to permit the "C" and/or "H" and/or "P" print format(s) to be stored as designations or assignments to the memory 60 for a most-recently exposed one of the film frames 12 each time the filmstrip 14 is advanced forward one frame increment (following a film exposure) from the film cartridge 18, and to change "C" and/or "H" and/or "P" print format(s) stored in the memory 60 for any one of the exposed film frames 12 (including the most-recently exposed film frame) any time. To store the newly selected information in the memory 60, an enter button 97 on the rear cover part 24 must be manually depressed which in turn closes a normally open enter switch 98 connected to the microcomputer 40.

The three-position print format selection/input button 90 remains in the last-used one of its three C−, H− and P− print format selection positions until such time as it is manually moved to another one of its three positions, i.e. the button does not default via a spring-urging to any one of the three positions. Although not shown, manual movement of the print format selection/input position button 90 to any one of its Free C−, H− and P− print format selection positions can serve to adjust a known variable print format mask in the viewfinder 64 to view the subject to be photographed in a viewing format that matches the position of the button.

If the print quantity input switch 84 is not closed one-to-ten times (to designate a print quantity number to be 1, 2, 3, 4, 5, 6, 7, 8, 9, or 0 prints) for a particular one of the selected "C", "H" or "P" print formats, a default print quantity number for that one selected print format is "1". The default print quantity number can be stored at a library address in the memory 60.

An exposed frame (image-viewing) selector button 100 is provided on the rear cover part 24, and when manually depressed one or more times closes a normally open exposed frame selector switch 102 connected to the microcomputer 40 the same number of times, to change the captured electronic image and the "C", and/or "H" and/or "P" print format(s) shown in the image display 62 for any one of the exposed film frames 12, and to change the C− and/or H− and/or P− print quantity number(s), print title, and print exposure correction shown in the status display 54 for the same exposed film frame, to the captured electronic image and the user-selected information for another one of the exposed film frames. This is possible because the captured electronic images that correspond to the exposed film frames, and the user-selected information for the exposed film frames, are stored in the memory 60. Thus, one can effectively scroll through the captured electronic images and the user-selected information stored in the memory 60 for the exposed film frames 12, and successively see the captured electronic images and the user-selected information for any one of the exposed film frames in the image and status displays 62 and 54. This is done in preparation for manually depressing the print quantity, title and exposure correction input buttons 78, 80 and 82 and the print format selection/ input button 90 to change the user-selected information stored in the memory 60 for any one of the exposed film frames 12 (when the enter button 97 is manually depressed).

A pair of identical film perforation sensors 104 and 106 for sensing successive pairs of film perforations 108 and 110 in the filmstrip 14 are mounted in respective pockets 112 and 114 in the film pressure platen 76 and are connected to the microcomputer 40. The film perforation sensors 104 and 106, as is known, are used via the microcomputer 40 to decrement a frame count (the number of available film frames 12) stored in the memory 60 by "1". The decrement occurs each time the filmstrip 14 is advanced forward a frame increment (following a film exposure). The frame count begins with "15", "25" or "40" depending on whether the filmstrip 40 has a 15-exposure, 25-exposure, or 40-exposure length, and it is shown in the status display 54. Consistent with the frame count, respective frame numbers for the captured electronic images can be stored at the single-image addresses "1" . . . in the memory 60.

A verify (print preview) button 116 is provided on the rear cover part 24, and when manually depressed closes a normally open verify switch 118 connected to the microcomputer 40. See FIGS. 1 and 2. The closed verify switch 118 causes the captured electronic image and the "C" and/or "H" and/or "P" print format(s) stored in the memory 60 for the most-recently exposed one of the film frames 12 to be shown in the image display 62, and it causes the C– and/or H– and/or P– print quantity number(s), print title, and print exposure correction stored in the memory for the same exposed film frame to be shown in the status display 54. If, however the exposed frame selector switch 102 had been closed to change the electronic image and the "C" and/or "H" and/or "P" print format(s) shown in the image display 62 and to change C– and/or H– and/or P– the print quantity number(s), print title, and print exposure correction shown in the status display 54, from that for the most-recently exposed one of the film frames 12 to that for an earlier exposed one of the film frames, then the closed verify switch 118 causes the captured electronic image and the user-selected information for the earlier exposed film frame to be shown in the displays.

A known multi-image creator 120 is connected to the microcomputer 40 to create a single multi- (index-) image from the captured electronic images stored as digital image data at the respective single-image addresses "1" . . . in the memory 60. This occurs when the motor 38 is actuated to rewind the exposed film length rearward into the film cartridge 18 (following the last exposure) the first time. The multi- (index-) image is composed only of those electronic images for which the designated number of prints is "1" or greater. The microcomputer 40 prevents the multi-image creator 120 from acting upon a captured electronic image for which the print quantity designation is "0", in order to not include that electronic image in the multi-image. The multi-image creator 120 sequentially assigns the digital image data for those electronic images whose print quantity designations are at least "1" to successive portions of a multi-image address in the memory 60 which is distinct from the single-image addresses "1" . . . "40" in the memory. See FIG. 5.

The multi- (index-) image can optionally include the print title for each captured electronic image included in the multi-image.

The magnetic head 72 records a magnetic representation of the multi-image along a magnetic image track (not shown) on the transparent magnetic overlay on the filmstrip 14 when the exposed film length is advanced out of the film cartridge 18. See FIG. 5. The magnetic image track is closely parallel to the magnetic information track 16.

When the exposed film length is rewound rearward into the film cartridge 18 the second time, manually depressing the verify button 116 to close the verify switch 118 causes the multi-image stored in the memory 60 to be shown in the image display 62. At this time, the verify button 116 can no longer serve to cause a single electronic image to be shown in the image display 62.

OPERATION

Figure 4:
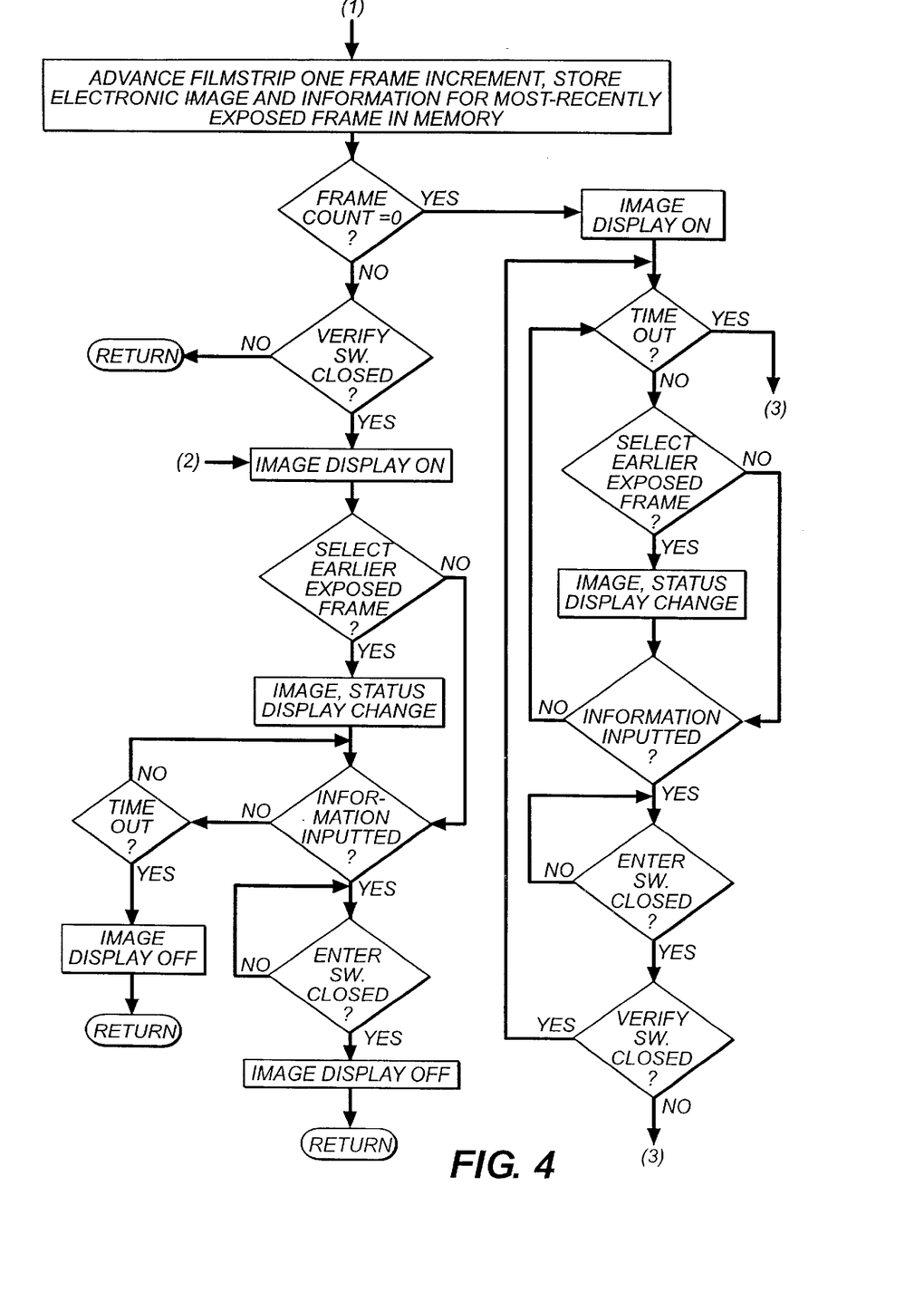
Figure 5:
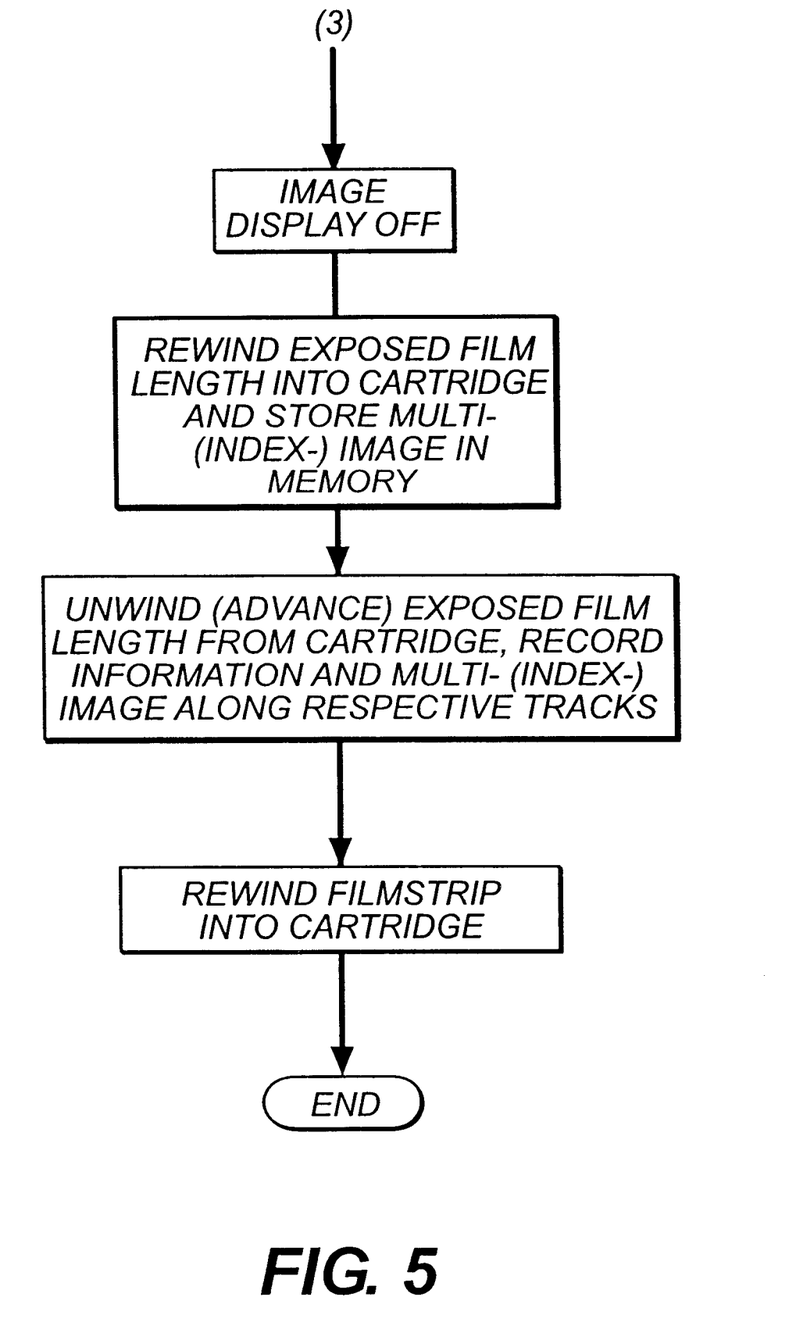

The operation of the camera 10 is shown in a flow chart in FIGS. 3–5.

1. Starting at FIG. 3, when the camera 10 is electrically powered "on" by flipping up the electronic flash unit 46, the status display 54 is simultaneously turned "on." The status display 54 shows, among other things, the frame count (the number of available film frames 12) stored in the memory 60.

2. If then in FIG. 3 the cartridge present switch 50 remains open because no film cartridge 18 is present in the cartridge receiving chamber 26, the no-cartridge warning 52 is provided in the status display 54.

3. If conversely in FIG. 3 the cartridge present switch 50 is closed because the film cartridge 18 is present in the cartridge receiving chamber 26, the memory 60 is interrogated to determine whether the frame count is greater than "0".

4. If then in FIG. 3 the frame count in the memory 60 is "0", which indicates that the final available one of the film frames 12 has been exposed, i.e. there are no film frames remaining for exposure, the number "0" appears in the status indicator 54.

5. If conversely in FIG. 3 the frame count in the memory 60 is greater than "0", for example "23", which indicates that there are twenty-three film frames 12 available for exposure, the number "23" appears in the status indicator 54.

6. If next in FIG. 3 the verify switch 118 is closed, the image display 62 is turned "on" in FIG. 4 to show the electronic image stored in the memory 60 corresponding to the latent image on the most-recently exposed one (or alternatively on an earlier exposed one) of the film frames 12. Also, the status display 54 now shows the user-selected information stored in the memory 60 for the same exposed film frame, except that the visible indication of the selected "C" and/or "H" and/or "P" print format(s) for that exposed film frame is shown in the image display 62 superimposed on the electronic image.

7. If conversely in FIG. 3, the verify switch 118 remains open, and the release switch 68 is not closed within an allotted time, e.g. 150 seconds, determined by a timer 122 in the microcomputer 40, the camera 10 is powered "off" for battery conservation.

8. If conversely in FIG. 3, the verify switch 118 remains open, and the release switch 68 is closed within the allotted time, e.g. 150 seconds, determined by the timer 122 in the microcomputer 40, because a picture of the subject is being taken, a latent image of the subject is exposed on the film frame 12 at the backframe opening 30 and the electronic image sensor 58 is excited to form a captured electronic image of the subject which corresponds to the latent image on the newly exposed frame.

9. Then in FIG. 4 the motor 38 is actuated to incrementally rotate the film take-up spool 34 in order to advance the filmstrip 14 forward a frame increment and wind the most-recently exposed one of the film frames 12 onto the exposed film roll 36 on the spool. Also, the electronic image corresponding to the latent image on the most-recently exposed frame 12 and the user-selected information for the most-recently exposed frame are stored in the memory 60, and the frame count stored in the memory is decremented by "1", for example to "22." The electronic image is stored as digital image data in the next available one of the single-image addresses "1" . . . "40" in the memory 60.

10. If next in FIG. 4 the frame count in the memory 60 is greater than "0", the verify switch 114 can be closed.

11. If then in FIG. 4 the verify switch 1 18 is not closed within the allotted time, e.g. 150 seconds, determined by the timer 128 in the microcomputer 40, or alternatively the final release switch 68 is not closed within the same time, the camera 10 is powered "off" for battery conservation.

12. If conversely in FIG. 4 the verify switch 118 is closed within the allotted time (as in FIG. 3), e.g. 150 seconds, determined by the timer 122 in the microcomputer 40, the image display 62 is turned "on" to show the electronic image stored in the memory 60 corresponding to the latent image on the most-recently exposed one (or alternatively on an earlier exposed one) of the film frames 12. Also, the status display 54 now shows the user-selected information for the same exposed film frame, except that the visible indication of the selected "C" and/or "H" and/or "P" print format(s) is shown in the image display 62 superimposed on the electronic image.

13. If next in FIG. 4 the exposed frame selector switch 102 is not closed within the allotted time, e.g. 150 seconds, determined by the timer 122 in the microcomputer 40, and none of the user-selected information switches 84, 86, 88 and 94–96 are closed within a brief time, e.g. 10 seconds, determined by the timer, the image display 62 is turned "off". The camera 10 including the status display 54 remains "on."

14. If conversely in FIG. 4 the exposed frame selector switch 102 is not closed within the allotted time, e.g. 150 seconds, determined by the timer 122 in the microcomputer 40, and at least one of the user-selected information switches 84, 86, 88 and 94–96 is closed within the brief time, e.g. 10 seconds, determined by the timer, then when the enter switch 98 is closed, the image display 62 is turned "off", and the electronic image and the newly selected information for the most-recently exposed one of the film frames 12 are stored in the memory 60 in place of the previously stored information for the same exposed film frame. The electronic image simply replaces itself at one of the addresses "1" . . . "40" in the memory 60.

15. If alternatively in FIG. 4 the exposed frame selector switch 102 is closed within the allotted time, e.g. 150 seconds, the electronic image and the user-selected information stored in the memory 60 for any one of the earlier exposed film frames (not the most-recently exposed film frame) are shown in the status and image displays 54 and 62 in place of the previously shown image and information for another one of the exposed film frames. Then, when at least one of the user-selected information switches 84, 86, 88 and 94–96 is closed within the brief time, e.g. 10 seconds, and the enter switch 98 is closed, the image display 62 is turned "off", and the electronic image and the newly selected information for the earlier exposed film frame 12 are stored in the memory 60 in place of the previously stored information for the same exposed film frame. The electronic image simply replaces itself at one of the addresses "1" . . . "40" in the memory 60.

16. If in FIG. 4 the frame count in the memory 60 is "0", the image display 62 is turned "on" to show the electronic image stored in the memory 60 corresponding to the latent image on the final exposed one of the film frames 12. Also, the status display 54 now shows the user-selected information for the same exposed film frame, except that the visible indication of the selected "C" and/or "H" and/or "P" print format(s) is shown in the image display 62 superimposed on the electronic image. The image display 62 is turned "on" in this instance (as compared with the other instance in FIG. 4 that it is turned "on") without having to first close the verify switch 118.

17. If next in FIG. 4, the unexposed frame selector switch 102 is not closed within the allotted time, e.g. 150 seconds, and none of the user-selected information switches 84, 86, 88 and 94–96 are closed within a brief time, e.g. 10 seconds, the image display is turned "off" as indicated in FIG. 5, and the motor 38 is actuated to continuously rotate the film spool inside the film cartridge 18 in order to rewind the exposed film length rearward into the cartridge the first time. When the exposed film length is rewound rearward into the film cartridge 18 the first time, the multi-image creator 120 sequentially assigns the digital image data for those electronic images whose print quantity designations are at least "1" to successive portions of the multi-image address in the memory 60 to create the multi- (index-) image. Then, the motor 38 is actuated to continuously rotate the film take-up spool 34 in order to advance the exposed film length out of the film cartridge 18, and the magnetic head 72 magnetically records the user-selected information stored in the memory 60 for each exposed film frame on the exposed film length along the magnetic information track 16 adjacent each exposed film frame and magnetically records a magnetic representation of the multi-image along the magnetic image track closely parallel to the magnetic information track. Then, the motor 38 is actuated to continuously rotate the film spool inside the film cartridge 18 in order to rewind the exposed film length rearward into the cartridge the second time. Finally, the door 28 is pivoted open to remove the film cartridge 18 from the cartridge receiving chamber 26.

18. If conversely in FIG. 4 the unexposed frame selector switch 102 is not closed within the allotted time, e.g. 150 seconds, and at least one of the user-selected information switches 84, 86, 88 and 94–96 is closed within the brief time, e.g. 10 seconds, the image display 62 remains "on." Then when the enter switch 98 is closed and the verify switch 118 is not closed within the allotted time, e.g. 150 seconds, the image display 62 is turned "off" as indicated in FIG. 5, and the motor 38 is actuated to continuously rotate the film spool inside the film cartridge 18 in order to rewind the exposed film length rearward into the cartridge the first time. When the exposed film length is rewound rearward into the film cartridge 18 the first time, the multi-image creator 120 sequentially assigns the digital image data for those electronic images whose print quantity designations are at least "1" to successive portions of the multi-image address in the memory 60 to create the multi- (index-) image. Then, the motor 38 is actuated to continuously rotate the film take-up spool 34 in order to advance the exposed film length out of the film cartridge 18, and the magnetic head 72 magnetically records the user-selected information stored in the memory 60 for each exposed film frame on the exposed film length along the magnetic information track 16 adjacent each exposed film frame and magnetically records a magnetic representation of the multi-image along the magnetic image track closely parallel to the magnetic information track. Then, the motor 38 is actuated to continuously rotate the film spool inside the film cartridge 18 in order to rewind the exposed film length rearward into the cartridge the second time. Finally, the door 28 is pivoted open to remove the film cartridge 18.

19. If alternatively in FIG. 4 the unexposed frame selector switch 102 is closed Within the allotted time, e.g. 150 seconds; the electronic image and the user-selected information stored in the memory 60 for any one of the earlier exposed film frames (not the most-recently exposed film frame) is shown in the status and image displays 54 and 62. Then, as in step 15, when at least one of the user-selected information switches 84, 86, 88 and 94–96 is closed within the brief time, e.g. 10 seconds, and the enter switch 98 is closed, the electronic image and the newly selected information for the earlier exposed film frame 12 are stored in the memory 60 in place of the previously stored information for the same exposed film frame. If the verify switch 118 is not closed within the allotted time, e.g. 150 seconds, the image display 62 is turned "off" as indicated in FIG. 5, and the motor 38 is actuated to continuously rotate the film spool inside the film cartridge 18 in order to rewind the exposed film length rearward into the cartridge the first time. When the exposed film length is rewound rearward into the film cartridge 18 the first time, the multi-image creator 120 sequentially assigns the digital image data for those electronic images whose print quantity designations are at least "1" to successive portions of the multi-image address in the memory 60 to create the multi- (index-) image. Then, the motor 38 is actuated to continuously rotate the film take-up spool 34 in order to advance the exposed film length out of the film cartridge 18, and the magnetic head 72 magnetically records the user-selected information stored in the memory 60 for each exposed film frame on the exposed film length along the magnetic information track 16 adjacent each exposed film frame and magnetically records a magnetic representation of the multi- image along the magnetic image track closely parallel to the magnetic information track 16. Then, the motor 38 is actuated to continuously rotate the film spool inside the film cartridge 18 in order to rewind the exposed film length rearward into the cartridge the second time. Finally, the door 28 is pivoted open to remove the film cartridge 18.

20. If conversely in FIG. 4 the verify switch 118 is closed within the allotted time, e.g. 150 seconds, go back to step 17 above.

The invention is disclosed as being embodied preferably in a motorized film advance camera. Because the features of a motorized film advance camera are generally known, the description which follows is directed in particular only to those elements forming part of or cooperating directly with the disclosed embodiment. It is to be understood, however, that other elements may take various forms known to a person of ordinary skill in the art.

PARTS LIST 10. camera
12. film frames
14. filmstrip
16. magnetic information track
18. film cartridge
20. main body part
22. front over part
24. rear cover part
26. cartridge receiving chamber
28. bottom door
30. backframe opening
32. exposed film take-up chamber
34. film take-up spool
36. exposed film roll
38. drive motor
40. microcomputer
42. spool cavity
44. spool end
46. electronic flash unit
48. power switch
50. cartridge present switch
52. no-cartridge warning
54. status display
56. window
58. electronic image sensor
60. memory
62. image display
64. viewfinder
66. shutter release button
68. release switch
70. shutter
72. magnetic head
74. opening
76. film pressure platen
78. print quantity input button
80. print title input button
82. exposure correction input button
84. print quantity input switch
86. print title switch
88. exposure correction switch
90. format selection/input button
92. top plate
94. C switch
95. H switch
96. P switch
97. enter button
98. enter switch
100. exposed frame selector button
102. exposed frame selector switch
104. film perforation sensor
106. film perforation sensor
108. film perforation
110. film perforation
112. pocket
114. pocket
116. verify button
118. verify switch
120 multi-image creator
122. timer

What is claimed is:

1. A dual image capture camera for capturing successive film images on a filmstrip and for capturing successive electronic images that correspond to the respective film images, including a memory that stores captured electronic images and a film drive motor that is actuated to rewind an exposed film length with the respective film images into a film cartridge, is characterized in that:

said memory is connected to said film drive motor to store captured electronic images as a single multi-image composed of the successive electronic images when the exposed film length with the respective film images is rewound into the film cartridge.

2. A dual image capture camera as recited in claim 1, wherein said memory stores captured electronic images individually when the respective film images are captured on the filmstrip, and a multi-image creator is connected to said memory and said film drive motor to create the single multi-image from electronic images individually stored in said memory when the exposed film length with the respective film images is rewound into the film cartridge.

3. A dual image capture camera as recited in claim 1, wherein a magnetic head records a magnetic representation of the single multi-image on a transparent magnetic overlay on the filmstrip.

4. A dual image capture camera as recited in claim 1, wherein said memory has a plurality of single-image addresses and a multi-image address to store captured electronic images individually at the respective single-image addresses and to store the single multi-image at said multi-image address.

5. A dual image capture camera for capturing successive film images on a filmstrip and for capturing successive electronic images that correspond to the respective film images, including a memory that stores captured electronic images, is characterized in that:

a print quantity selector is capable of being manually operated to provide various print quantity designations of how many prints are to be made for the respective film images, including the designation that no print is to be made for a particular film image; and said memory is connected to said print quantity selector to store captured electronic images as a single multi-image which combines only those electronic images for which the designated number of prints is at least "1".

6. A dual image capture camera for capturing successive film images on a filmstrip and for capturing successive electronic images that correspond to the respective film images, including a memory that individually stores captured electronic images and a film drive motor that is actuated to rewind an exposed film length with the respective film images into a film cartridge, is characterized in that:

a print quantity selector is capable of being manually operated to provide various print quantity designations of how many prints are to be made for the respective film images, including the designation that no print is to be made for a particular film image; and said memory is connected to said print quantity selector to store designations of numbers of prints in association with the respective electronic images individually stored in said memory and is connected to said film drive motor to store captured electronic images as a single multi-image which combines only those electronic images for which the designated number of prints is at least "1" when the exposed film length with the respective film images is rewound into the film cartridge.

7. A dual image capture camera for capturing successive film images on a filmstrip and for capturing successive electronic images that correspond to the respective film images, including a memory that individually stores captured electronic images and a film drive motor for unwinding a film length of the filmstrip from a film cartridge and rewinding the same film length into the film cartridge, is characterized in that:

said film drive motor is actuated to rewind a film length with captured film images into the film cartridge a first time, then to unwind the same film length from the film cartridge, and finally to rewind the same film length into the film cartridge a second time;

said memory is connected to said film drive motor to store captured electronic images as a single multi-image composed of the successive electronic images when the film length with captured film images is rewound into the film cartridge the first time; and a magnetic head magnetically records a magnetic representation of the single multi-image on a transparent magnetic overlay on the filmstrip when the film length with captured film images is unwound from the film cartridge.

8. An image storing method in a dual image capture camera for capturing successive film images on a filmstrip and for capturing successive electronic images that correspond to the respective film images, comprises the steps of:

rewinding an exposed film length with the respective film images into a film cartridge; and storing captured electronic images as a single multi-image composed of the successive electronic images when the exposed film length images is rewound into the film cartridge.

9. An image storing method in a dual image capture camera for capturing successive film images on a filmstrip and for capturing successive electronic images that correspond to the respective film images, comprises the steps of:

providing various print quantity designations of how many prints are to be made for the respective film images, including the designation that no print is to be made for a particular film image; and storing captured electronic images as a single multi-image which combines only those electronic images for which the designated number of prints is at least "1".

10. An image storing method in a dual image capture camera for capturing successive film images on a filmstrip and for capturing successive electronic images that correspond to the respective film images, comprises the steps of:

providing various print quantity designations of how many prints are to be made for the respective film images, including the designation that no print is to be made for a particular film image;

rewinding an exposed film length with captured film images into a film cartridge; and storing captured electronic images as a single multi-image which combines only those electronic images for which the designated number of prints is at least "1" when the exposed film length is rewound into the film cartridge.

11. A camera comprising an electronic image sensor that captures successive electronic images and a memory that stores captured electronic images, is characterized in that:

a print quantity selector is capable of being manually operated to provide various print quantity designations of how many prints are to be made for the respective electronic images, including the designation that no print is to be made for a particular film image; and said memory is connected to said print quantity selector to store captured electronic images as a single multi-image which combines only those electronic images for which the designated number of prints is at least "1".

12. An image storing method in a camera for capturing successive electronic images, comprises the steps of:

providing various print quantity designations of how many prints are to be made for the respective electronic images, including the designation that no print is to be made for a particular film image; and storing captured electronic images as a single multi-image which combines only those electronic images for which the designated number of prints is at least "1".

* * * * *